United States Patent [19]

Hosokawa et al.

[11] Patent Number: 4,816,313
[45] Date of Patent: Mar. 28, 1989

[54] RESIN PRODUCT WITH MAIN RESIN BODY AND SOFT RESIN COVERING PART

[75] Inventors: Takeshi Hosokawa; Shigeru Yabuya; Keizo Ito; Akiyoshi Nagano; Takaharu Yoshimi; Shoji Sakaida, all of Aichi, Japan

[73] Assignee: Toyoda Gosei Co., Ltd., Nishi, Japan

[21] Appl. No.: 97,446

[22] Filed: Sep. 16, 1987

[30] Foreign Application Priority Data

| Sep. 19, 1986 | [JP] | Japan | 61-222676 |
| Nov. 27, 1986 | [JP] | Japan | 61-282599 |
| Dec. 5, 1986 | [JP] | Japan | 61-290737 |
| Dec. 5, 1986 | [JP] | Japan | 61-290738 |
| Dec. 5, 1986 | [JP] | Japan | 61-290739 |
| Dec. 5, 1986 | [JP] | Japan | 61-290740 |

[51] Int. Cl.$^4$ .................. B32B 27/08; B32B 27/32
[52] U.S. Cl. .................. 428/90; 428/95; 428/174; 428/517; 428/521; 428/424.8; 428/461
[58] Field of Search .................. 428/90, 95, 174, 517, 428/521, 424.8, 461

[56] References Cited

U.S. PATENT DOCUMENTS 4,332,858  6/1982  Saitoh et al. .................. 428/517

Primary Examiner—Marion C. McCamish
Attorney, Agent, or Firm—Cushman, Darby & Cushman

[57] ABSTRACT

A soft resin product is described, which comprises a resin main body and a soft resin covering part, wherein said resin main body comprises polyolefin and said soft resin covering part comprises a styrene based thermoplastic elastomer composition having a hardness $H_s$ of 20 to 50.

11 Claims, 7 Drawing Sheets

RESIN PRODUCT WITH MAIN RESIN BODY AND SOFT RESIN COVERING PART

FIELD OF THE INVENTION

This invention relates to a soft resin product comprising a resin main body and a soft resin covering part, and more particularly, to automobile internal trim parts in which a soft touch is strongly required, such as a center cluster, a center pillar, a kneepad, an instrument panel, a steering caul, a steering wheel pad, a console box, a glove box, an arm rest, a door trim and the like, or products suitable for automobile exterior trim parts such as bumper, side moldings and the like.

BACKGROUND OF THE INVENTION

Hitherto, the composition of soft resin products applied, for example, to automobile internal trim parts comprises of in general polypropylene (hereinafter, referred to as "PP") from the standpoint of lightening the resin main body, the soft resin covering part thereof being formed with soft vinyl chloride (hereinafter, referred to as "soft PVC") or foamed soft PVC-polyurethane.

In the soft resin products of the above mentioned composition, there are found problems as mentioned hereinafter:

Now, there are explained for resin products which are obtained by a prior art:

(1) In FIG. 1-3, an example of resin product, i.e., a center cluster, is shown, in which a resin main body (resin insert) 1 of polypropylene (PP) is bonded to a soft resin covering part 2 formed from soft polyvinyl chloride (soft PVC) or foamed soft PVC-polyurethane by means of an adhesive 5 and then a paint 4 is coated on the surface of soft resin covering part 2. Because in the resin product, i.e., center cluster, the adhesion between the resin main body and the soft resin covering part is not so good that a layer of adhesive may be required, productivity of the resin product becomes low.

(2) As shown in FIG. 2—2, a resin product applied for automobile internal trim parts, i.e., center pillar, comprises of a resin main body (resin insert) 21 and a soft resin covering part 22, which is covered on the surface of the main body. As the resin main body 21, polyolefins are used from the viewpoint of lightening, and as the soft resin covering part 22, soft resins such as soft polyvinyl chloride and the like or foamed resins such as foamed polyvinyl chloride resin or foamed polyurethane resin are used. A decorating part 26 is then formed on the surface of the soft resin covering part 22 to use as automobile internal trim parts. However, when a soft polyvinyl chloride resin is used as the soft resin covering part 22 of such resin product as formed as above, there is a problem where the adhesion between the resin main body 21 and the covering part 22 is not good.

(3) Among resin products (i.e., kneepads) applied to an automobile, as shown in FIGS. 3-2 and 3-3, there is mentioned a resin product 34 which comprises a resin main body 31, a soft resin covering part 32 covered on the surface of the main body and a surface layer 33 formed thereon. In the resin product 34, from the viewpoint of lightening, polyolefin is generally used as the resin main body 31 and as said soft resin covering part 32, a foamed resin such as polyurethane and the like is used. And for the improvement of surface properties (for example, weather resistance, scratch resistance of exposed surface, etc.), a surface layer 33 of polyvinyl chloride resin is formed on the covering part 32. However, in the resin product 34, it is necessary for the thickness of the soft resin covering part 32 to be 4 mm or more in order to show the function of a foamed resin. Therefore, it is undesirable to form a resin product 34, in which the thickness of the covering part 32 is less than 4 mm, resulting in a restricted variation of shape design.

(4) As shown in FIGS. 4-2 and 4-3, a resin product 45 (i.e., a kneepad) in which a soft resin covering part 42 comprising a polyvinyl chloride resin foam or a polyurethane resin foam and the like is formed on a substrate 44 of metal plate and then a surface layer 43 of polyvinyl chloride and the like is laminated thereon to protect the covering part 42 is hitherto used. The resin product 45 of above-described structure is available in various kinds of fields, particularly in the field of automobile internal trim parts, and however, the softness of the resin product 45 is not shown sufficiently when the covering part 42 has not a thickness of more than a prescribed value, for example, more than 4 mm. Therefore, a resin product 45 of foam type can not be used for the application of small thickness resulting in a restricted variation of shape design. Moreover, in the process for the production of the resin product 45, the formation of foamed covering part 42 by pouring a foaming resin between a substrate 44 and a surface layer 43 requires a curing step which occupies much time, and further the removal of burrs after molding is necessary. Thus, there are problems in the process for the production of the resin product.

(5) A resin product 55 (i.e., kneepad), as shown in FIGS. 5-2 and 5-3, in which a soft resin coat part 52 comprising a polyvinyl chloride resin foam or a polyurethane resin foam is formed on a substrate 54 of metal plate and the covering part 52 is coated with a surface layer 53 of polyvinyl chloride resin and the like to protect the covering part is hitherto used. The resin product 55 of abovedescribed structure is available in various kinds of fields, particularly in the field of automobile internal trim parts and, however, the softness of the resin product 55 is not shown sufficiently when the covering part 52 has not a thickness of more than a prescribed value, for example, 4 mm or more. Therefore, there are problems where its use is restricted for the application of small thickness and for the variation of shape design. Moreover, in the process for the production of the resin product 55, the formation of foamed covering part 52 by pouring a foaming resin between a substrate 54 and a surface layer 53 requires a curing step which occupies much time and further the removal of burrs after molding is necessary. Thus, there are problems in the process for the production of the resin product.

(6) There are resin product having a general structure, in which a soft resin covering part (soft resin sheet) of soft resin is applied onto the surface of a resin main body of hard resin. As the soft resin covering part (soft resin sheet), there has been hitherto used widely a laminate sheet in which a thin resin main body (protective layer) of a polyvinyl chloride resin and the like is bonded to the surface of spongy soft resin covering part of foamed polyolefin resin and the like. For the formation of the resin product by using the laminate sheet, the following methods are employed:

(i) A laminate sheet is set previously on a metal mold for injection, a hard resin is then injection-molded onto the back surface of the laminate sheet to form a resin main body and at the same time bond the resin main body to the laminate sheet;

(ii) A laminate sheet is set on a metal mold for blow-molding and a hard resin is blow-molded onto the back surface of the laminate sheet; and (iii) A stamping molding method.

However, there are problems where the adhesion between the spongy soft resin covering part and the resin main body in the laminate sheet is not good, and the spongy resin covering part having a thickness of less than 4 mm does not provide a soft touch.

Further, in the formation of the resin product with the laminate sheet by means of anyone of the methods (i) to (iii), there are found the following problems:

A laminate sheet is heated near to or above the softening temperature by means of molten hard resin for the resin main body or the metal mold in the molding process and subjected to a high molding pressure.

Accordingly, air foams (hereinafter, referred to as "voids") in the spongy covering part of laminate sheet are broken by the molding pressure resulting in that the resin product after molding does not show a sufficient soft feeling (touch).

Therefore, problems in soft resin products having the above-described structure are described as follows:

(a) The adhesion between the resin main body and the soft resin covering part is not good, so that it is necessary to activate the surface of the resin main body and apply adhesives thereon, resulting in a low productivity;

(b) When a foamed resin such as a foamed polyvinyl chloride or a foamed polyurethane resin and the like which is used previously as said soft resin covering part, is used, it is necessary to keep the thickness of the soft resin covering part 4 mm or more to sufficiently show the function of the foam resin, resulting in a restricted variation of shape design of moldings.

SUMMARY OF THE INVENTION

The object of this invention is to provide a soft resin product which has such a structure that may solve said problems, a good-softness (a good soft touch) and superior surface properties such as scratch resistance, weather resistance and the like.

As a result of various studies to solve the said problems, the present inventors have found a soft resin product having a structure as described below: A soft resin product comprising a resin main body and a soft resin covering part wherein said resin main body comprises polyolefin and said soft resin covering part comprises a styrene based thermoplastic elastomer composition of having a hardness $H_s$ of 20 to 50.

BRIEF DESCRIPTION OF THE DRAWINGS

FIG. 1-2 is a perspective view of said center cluster;

FIG. 1-3 is a partially omitted section view of conventional center cluster at line A—A portion in FIG. 1-2.

1: Resin main body (resin insert),
2: Soft resin covering part,
3: Soft resin insertion,
4: Paint (paint layer),
5: Adhesive (adhesive layer).

Figure 1:
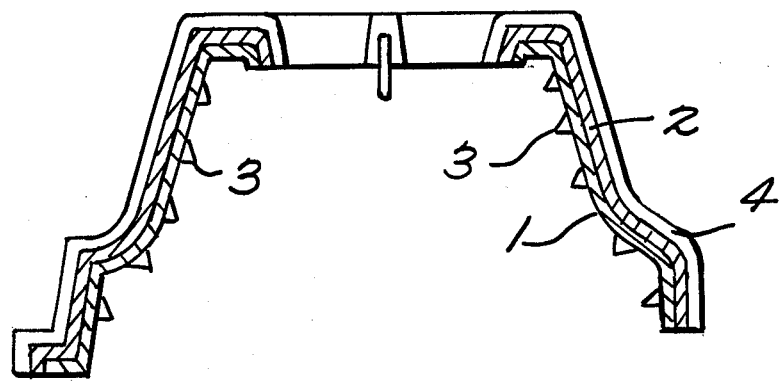
FIG. 1-1 is a partially omitted section view of center cluster in Example 1 applied in this invention at line A—A portion in FIG. 1-2.
Figures 1, 2:
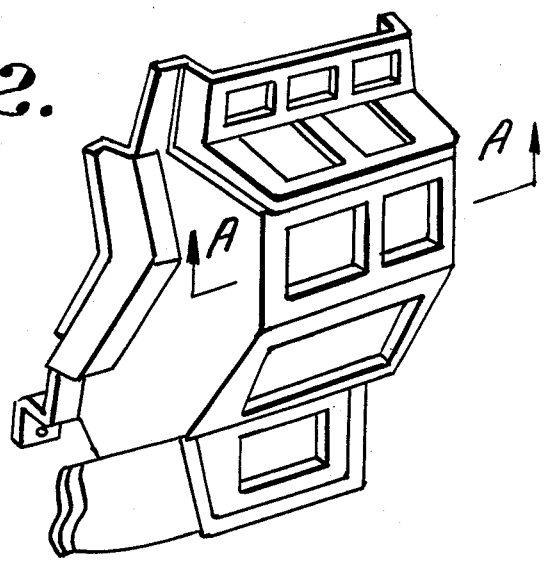

FIG. 2-1 is a partial perspective view of center pillar of Example 2 applied in this invention;

FIG. 2-2 is a partial perspective view of previous center pillar.

21: Resin main body,
22: Soft resin covering part,
22a: Adhesion-improved surface,
23: Adhesive layer,
24: Flocking part,
25: Resin Product,
26: Decorating part.

Figures 1, 2, 3:
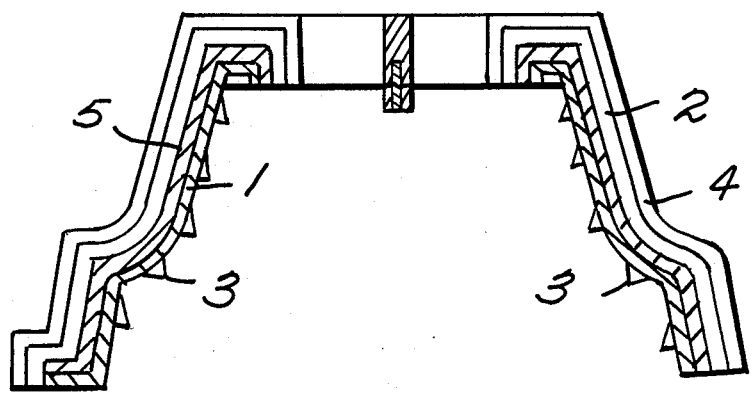
Figures 1, 2:
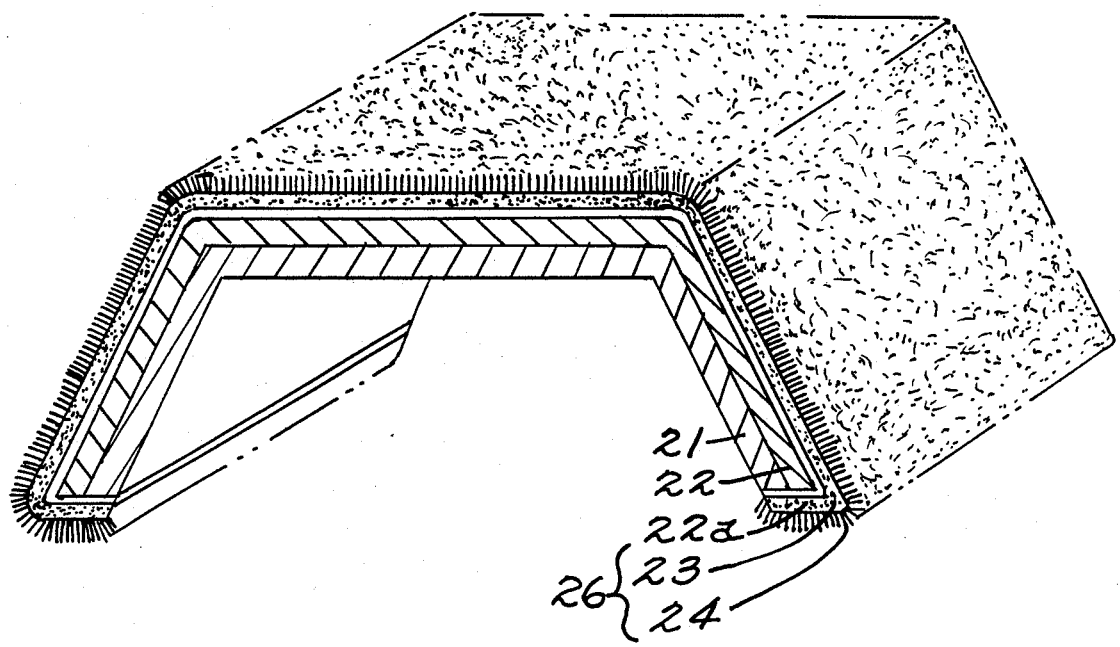
Figure 2:
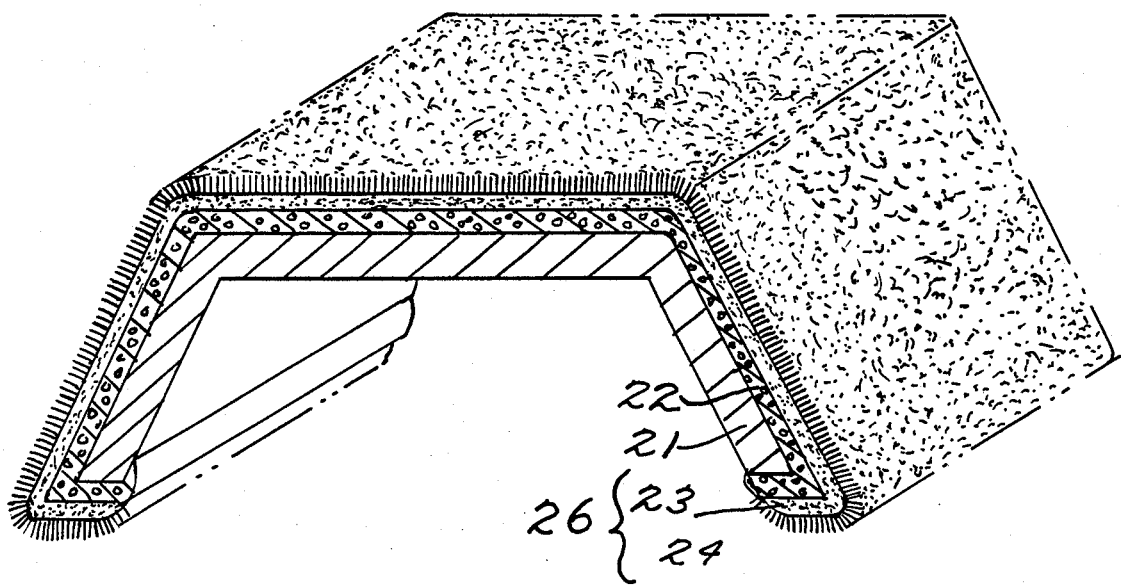
Figures 1, 3:
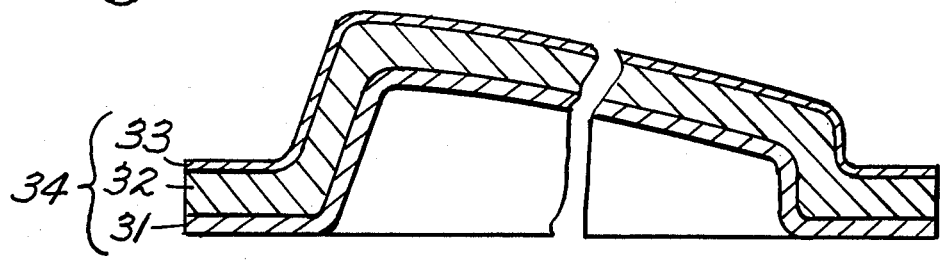
Figures 2, 3:
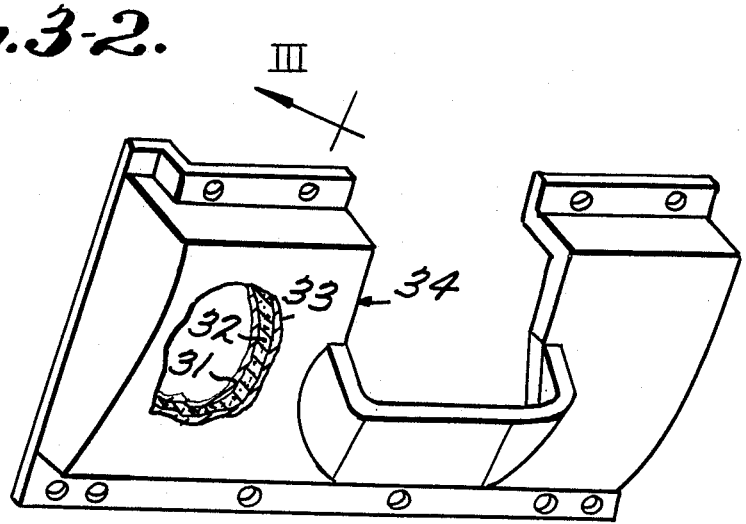
Figure 3:
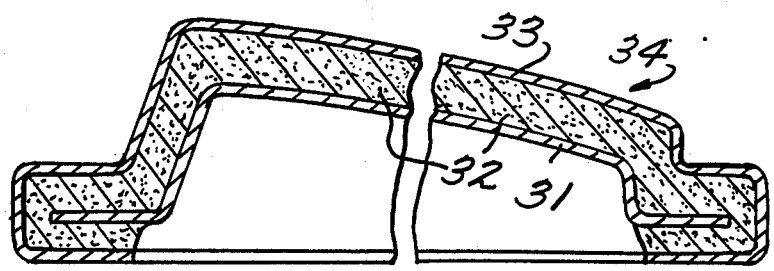

FIG. 3-1 is a section view of kneepad of Example 3 applied in this invention;

FIG. 3-2 is a partial perspective view of conventional kneepad;

FIG. 3-3 is a section view of previous kneepad in the direction of III—III in FIG. 3-2.

31: Resin main body,
32: Soft resin covering part,
33: Surface layer,
34: Resin product.

Figures 1, 4:
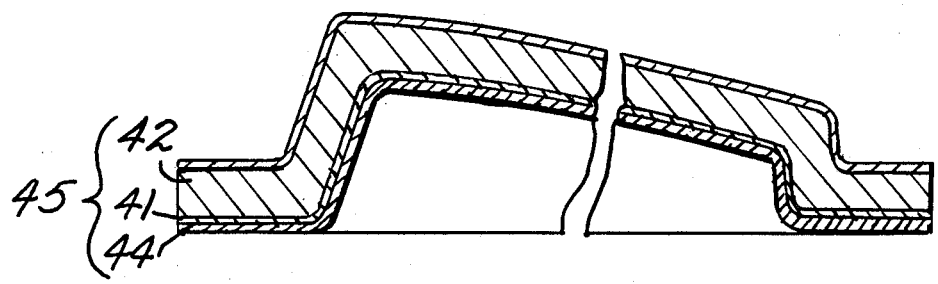
Figures 2, 4:
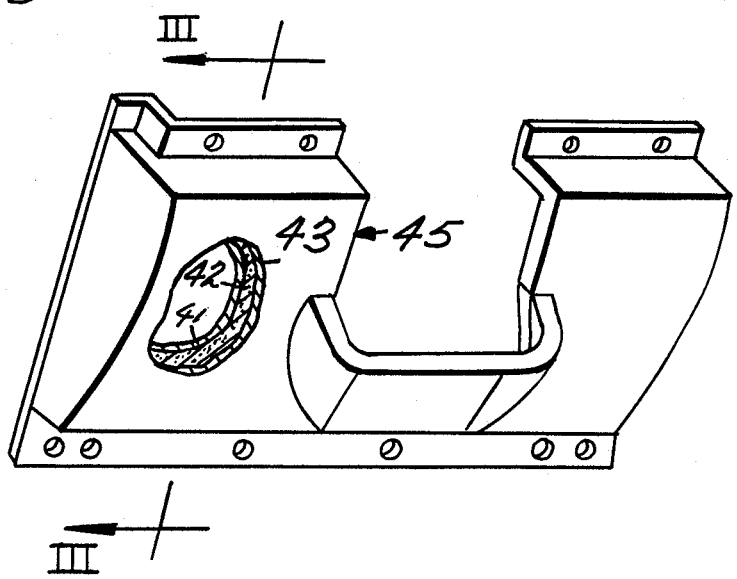
Figures 3, 4:
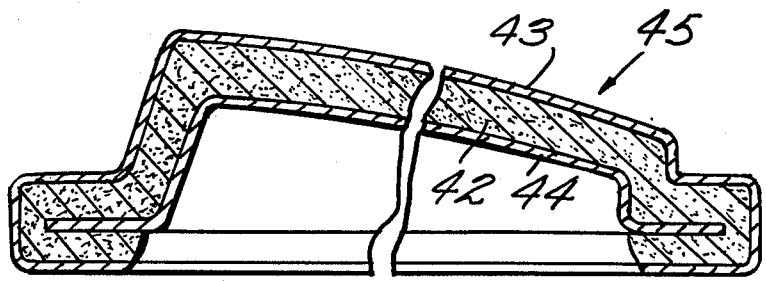

FIG. 4-1 is a section view of kneepad of Example 4 applied in this invention;

FIG. 4-2 is a partial perspective view of conventional kneepad;

FIG. 4-3 is a section view of conventional kneepad in the direction of III—III in FIG. 4-2.

41: Resin main body,
42: Soft resin covering part,
43: Surface layer,
44: Base material,
45: Resin product.

Figures 1, 5:
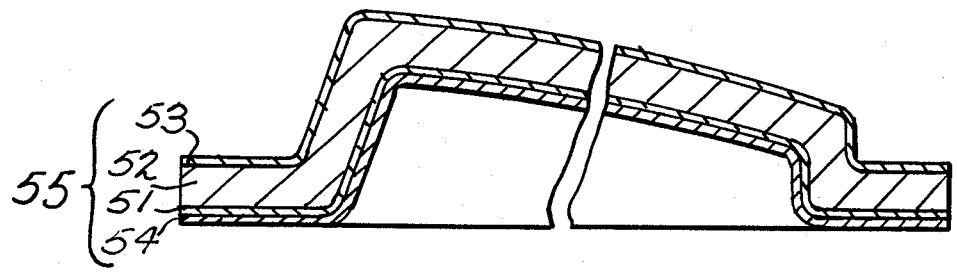
Figures 2, 5:
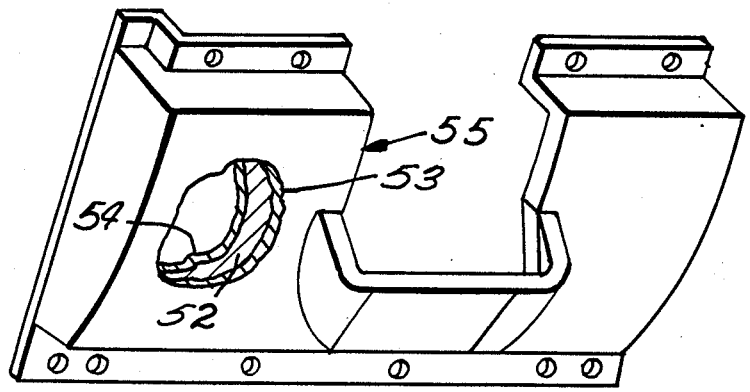
Figures 3, 5:
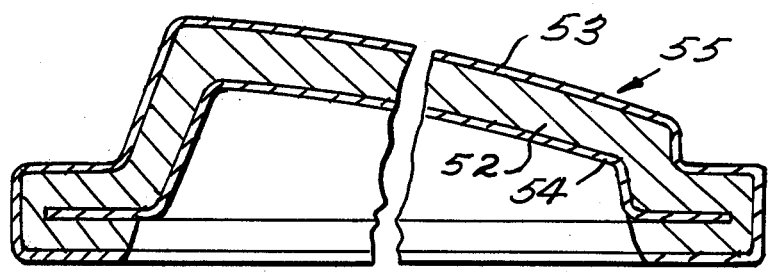

FIG. 5-1 is a section view of kneepad of Example 5 applied in this invention;

FIG. 5-2 is a partial perspective view of conventional kneepad;

FIG. 5-3 is a section view of conventional kneepad in the direction of III—III in FIG. 5-2.

51: Resin main body,
52: Soft resin covering part,
53: Surface layer,
54: Base material,
55: Resin product.

Figures 1, 6:
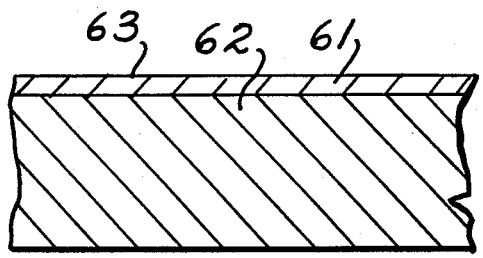
Figures 2, 6:
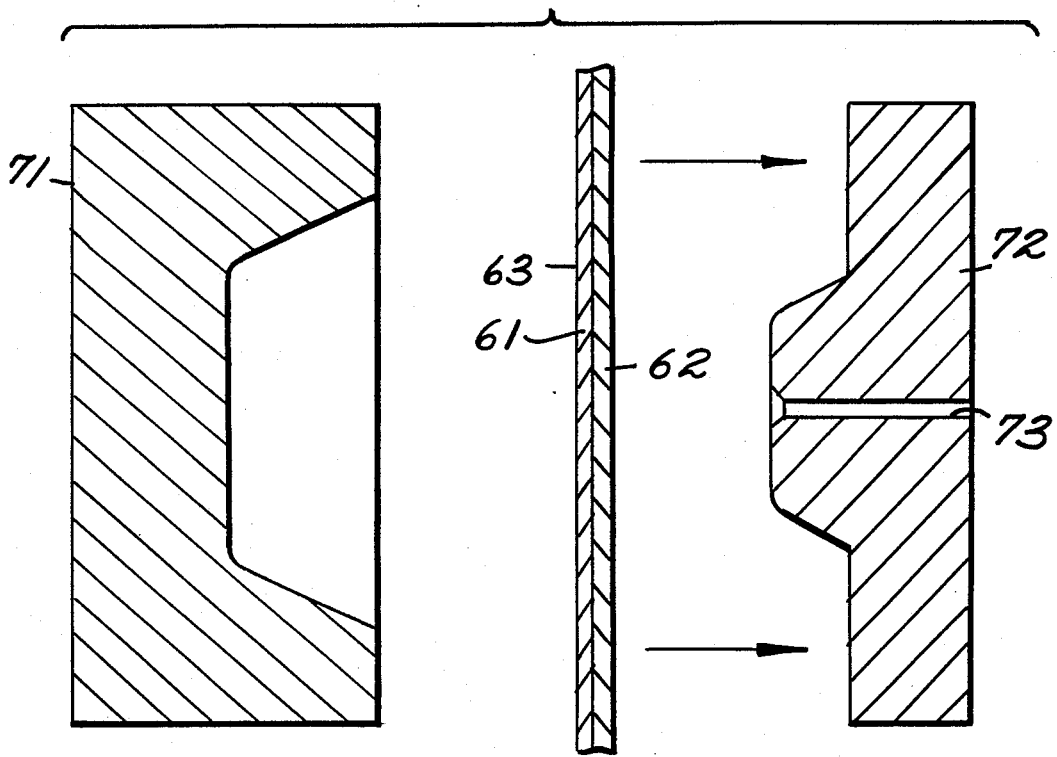
Figures 3, 6:
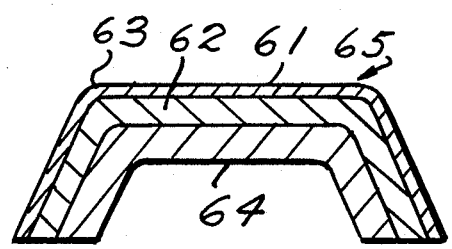
Figures 4, 6:
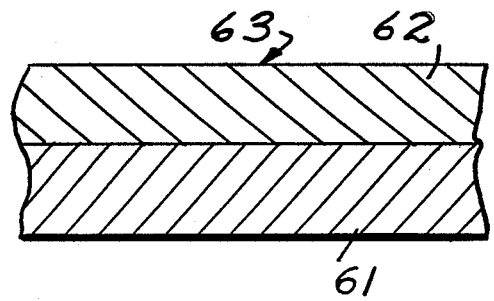
Figures 5, 6:
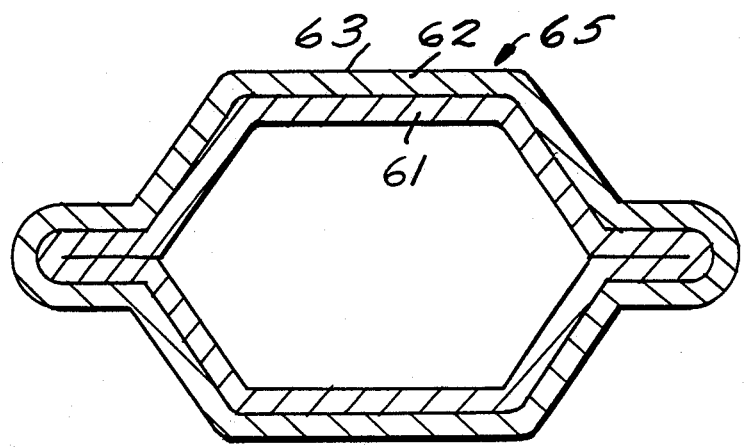

FIG. 6-1 is a partially enlarged section view of molding laminate sheet of Example 6 applied in this invention;

FIG. 6-2 is a section view showing the molding method of resin product using the above molding laminate sheet;

FIG. 6-3 is a section view of the above resin product;

FIG. 6-4 is a partially enlarged section view of molding laminate sheet of Example 7 applied in this invention;

FIG. 6-5 is a section view of resin product formed with the above molding laminate sheet.

61: Resin main body of polyolefin,
62: Soft resin covering part of styrene based thermoplastic elastomer,
63: Molding laminate sheet,
64: Resin base material,
65: Resin product,
71: Movable mold,
72: Stationary mold,
73: Injection nozzle.

DETAILED DESCRIPTION OF THE INVENTION

This invention is explained in detail as follows: The resin main body of this invention comprises polyolefin and may be a polyolefin molding formed by injection, etc., a sheet or film of polyolefin; a sheet or film obtained by fusing a polyolefin to one side of substrate, which may be attached to polyolefin, by means of high frequency heating and the like; or a product obtained by coating a dispersion of polyolefin dissolved in a solvent on the substrate and drying. The substrate (i.e., a base material) which may be attached to the polyolefin includes metals such as steel, aluminum, etc., reinforced woods, mat materials and the like, preferably metals, and most preferably steel.

The polyolefin comprises polyethylene, polypropylene, ethylenepropylene copolymer and the like. Typical examples of the polyolefin include polypropylene (PP), hard polyethylene (hard PE), polyallomer (propylene-ethylene block copolymer), crosslinked polyolefin and the like. The polyolefin may be mixed with a filler such as glass fiber, talc, etc., for the provision of rigidity, and, in this case, an improved adhesion is obtained.

The soft resin covering part is formed of a styrene based thermoplastic elastomer composition (styrene based TPE) having a hardness $H_s$ (according to JIS K 6301) of 20 to 50. When a coating is applied on the soft resin covering part, a styrene based thermoplastic elastomer composition having a hardness $H_s$ of 30 to 50 is preferably used. When a surface layer is applied on the covering part, it is preferred to use a styrene based thermoplastic elastomer composition having a hardness $H_s$ of 20 to 50.

The styrene based thermoplastic elastomer here means a polystyrene-rubber inter block-polystyrene type block copolymer (preferably, styrene.ethylene.-butylene.styrene block copolymer), in which the rubber inter block comprises a polymer containing polybutadiene and/or polyisoprene. Namely, the styrene based thermoplastic elastomer is such a block polymer that comprises polybutadiene, polyisoprene, olefin copolymer and the like as soft segment and polystyrene as hard segment. Olefins of the olefin copolymer include ethylene, propylene, butene, butadiene, isoprene and the like, and preferably a combination of ethylene and butadiene or ethylene and butene is used.

The copolymerization ratio of the soft segment to the hard segment in the styrene based thermoplastic elastomer is determined depending on the softness thereof, and to obtain a resin product having low hardness, the copolymerization ratio is increased. In this invention, a styrene based thermoplastic elastomer is used preferably, in which the copolymerization ratio of soft to hard segment (weight ratio of soft segment/hard segment) is 60/40 to 95/5. A styrene based thermoplastic elastomer containing polybutadiene and/or polyisoprene as soft segment and having a copolymerization ratio of 80/20 or more is used particularly preferably.

More preferably, a styrene based thermoplastic elastomer is a polystyrene-rubber inter block-polystyrene/-straight chain block copolymer (i.e., a styrene.ethylene.butylene.styrene block copolymer) in which the double bonds in the rubber inter block polymer, i.e., in polybutadiene and/or polyisoprene which is used as the soft segment are saturated with hydrogen. Since the hydrogenated (hydrogenation) polymer contains no double bond in-molecules, it shows an excellent weather resistance and heat resistance, and thus is available as internal or exterior material for automobile.

The styrene based thermoplastic elastomer may be used alone or in combination with olefin based resins, oils, an anti-oxidant an inert filler, a fire-proofing agent and the like. For example, there is mentioned a commercial product of "RABALON SJ 4400" (trade name which is sold from Mitsubishi PetroChemical Co., Ltd.).

Typical properties of "RABALON SJ 4400" are as follows:

| | |
|---|---|
| Hardness $H_s$ (JIS K 6301) | 45 |
| Specific gravity (JIS K 7112) | 1.1 |
| MFR (JIS K 7210*1) | 0.4 g/10 min |
| 300% Stress (JIS K 6301*2) | 12 kg/cm² |

Test condition:
*1 230 × 2.16 kg
*2 JIS No. 3 Dunbbell; tensile speed: 500 mm/min The hardness $H_s$ (JIS K 6301) of the styrene based thermoplastic elastomer composition to be used is generally 20 to 50 and, when a coating is applied on the soft resin covering part, the hardness $H_s$ is 30 to 50, and, when a surface layer is formed on the soft resin covering part, the hardness $H_s$ is preferably 20 to 50. However, the thermoplastic elastomer composition having a hardness $H_s$ of less than 20 is too soft to give a prescribed elasticity and the composition having a hardness of more than 50 cannot provide a prescribed soft feeling (touch).

Thus, in a resin product (soft resin product) comprising a resin main body of polyolefin and a soft resin covering part of a styrene based thermoplastic elastomer composition, it is not significant whether the resin main body of polyolefin resins is on the surface of the resin product or adversely the resin main body is in the inside of the soft resin covering part, unless the softness effect of the soft resin covering part of the styrene based thermoplastic elastomer composition is not impaired.

The resin product is formed in such manner that a resin main body of polyolefin which is previously molded by means of injection and the like is set in a mold and the styrene based thermoplastic elastomer composition (styrene based TPE) is then formed by a molding means such as an injection molding, a blow molding, a vacuum molding, an insert RIM molding, press molding, extrusion molding, a stamping molding or co-extrusion molding.

In this case, in order to obtain a good adhesion between the resin main body and the soft resin covering part, it is not necessary to use an adhesive which is used in prior art. However, to ensure a further prevention of separation, holes for bonding may be formed in the resin main body and the resin of the soft resin covering part is extended through holes to the back surface of the resin main body to form soft resin insertions; A sufficient adhesion may be obtained without such insertions. The injection molding conditions for styrene based TPE:

Cylinder temperature: 190° to 210° C.;
Metal mold temperature: 30° to 70° C.;
Injection pressure: 400 to 500 kg/cm².

Even when the thickness of the soft resin covering part of the resin product obtained according to this invention is less than 4 mm, a sufficient soft feeling (touch) is provided, and the thickness is preferably 0.5 mm or more, and particularly preferably 1.5 to 3 mm.

Namely, a sheet of styrene based thermoplastic elastomer may also be used. And the surface of soft resin covering part may be wholly or partially coated with polyethylene or acrylic type paint or embossed further as in a prior art from the viewpoint of decorative design, wear resistance, abrasion resistance, etc.

Further, for the improvement of adhesion between the surface of a soft resin covering part and the decorating part, the surface is subjected to an activation treatment such as corona discharge treatment, plasma treatment, or a surface treatment such as primer treatment, is coated directly thereon with a paint such as polyurethane or acrylic type paint, or is coated with an adhesive (e.g., polyurethane based adhesive, etc. and preferably emulsion based adhesive) as an adhesive layer, in order to carry out flocking of short polyamide fibers or apply a sheet of cloth to form a decorating part.

In addition, to improve the weather resistance and surface properties such as scratch resistance of exposed surface, a surface layer of polyolefin such as polyethylene, polypropylene and the like (preferably, low density polyethylene) may be formed on the surface of soft resin covering part. Further, on the polyolefin surface layer, after the activation treatment such as plasma treatment or corona discharge treatment or the adhesion improving treatment such as primer treatment, a paint may be coated or the flocking may be carried out to form a decorating part. The coating or embossing may be applied directly on the polyolefin surface layer without the adhesion improving treatment.

The treatment for improving the adhesion between the soft resin covering part and the decorating part means an activation treatment in which the hydrocarbon residues in the styrene based thermoplastic elastomer of soft resin covering part are oxidized or radicalized to activate the surface or a primer treatment in which the surface of the covering part is coated with a various kind of primers suitable for the elastomer such as a chloroprene based primer in which methacrylate is grafted, and functional groups other than hydrocarbon residue being present in the primer. As the treatment for improving the adhesion according to this invention, either the activation treatment of the surface of the soft resin covering part alone, the primer treatment after the activation, or the primer treatment alone may be carried out.

The polyolefin surface layer is in the form of sheet or film on the surface of soft resin covering part and its thickness is 2 mm or less and preferably 0.1 to 0.7 mm.

This invention will be explained by the following examples so that it may be understood more fully. This invention can be carried out within the scope of technical idea according to this invenion without restricting to these examples.

EXAMPLE 1

A resin product, as shown in FIGS. 1-1 and 1-2, i.e., a center cluster, is explained, which may be applied to other internal or exterior trim part for automobile.

The resin main body 1 (resin insert) is made of a glass fiber-filled polyolefin.

The soft resin covering part 2 is formed with a styrene based thermoplastic elastomer composition (styrene based TPE) having a hardness $H_s$ (JIS K 6301) of 30 to 50 ("RABALON SJ 4400" manufactured by Mitsubishi Petro-Chemical Co., Ltd.).

For the formation of this center cluster, the resin main body 1 (thickness: 2.5 mm) of polyolefin which is formed previously by injection and the like is set in a metal mold and the insert molding is carried out with the styrene based TPE composition, by injection to form the soft resin covering part having a thickness of 2.5 mm, whereby a good adhesion between the resin main body 1 and the soft resin covering part 2 so that it is unnecessary to use an adhesive. Further, to ensure a further prevention of separation, holes for bonding are formed in the resin main body 1 and insertions 3 of soft resin are formed, said insertions being extended through the holes to the back surface of the resin main body 1.

Further, on the soft resin covering part 2, a coating 4 as a decorating part is applied. The injection conditions of soft resin covering part:
Cylinder temperature: 200° C.;
Metal mold temperature: 40° C.;
Injection pressure: 80 kg/cm².

A comparative center cluster for Comparative Example 1 is formed in the same manner as in Example 1, except that instead of styrene based TPE for the soft resin covering part having a thickness of 2.5 mm in Example 1, a foaming soft PVC composition (thickness: 4 mm or more) is used.

On the peeling test at 180° C. (test conditions: load cell: 100 kg; Full scale: 50 kg; Cross head speed: 100 mm/min), the adhesion strength between the resin main body and the soft resin covering part of Example 1 was 15 kg/cm, whereas there was found no adhesion between them in Comparative Example 1 and the measurement was impossible.

Even when the thickness of the soft resin covering part of Example 1 is less than 4 mm, a sufficient soft touch (equal to or more than the soft resin covering part having a thickness of 4 mm or more formed with the foamed soft PVC composition in Comparative Example 1) is obtained and the soft resin covering part may be thinned so that the variation of shape design of moldings may be increased.

In this connection, the hardness $H_s$ (JIS K 6301) of the resin product in Example 1 was 45, whereas the hardness $H_s$ of Comparative Example 1 was 60.

EXAMPLE 2

An example, in which an embodiment of this invention is realized as a center pillar of automobile, is explained based on FIG. 2-1.

In the resin product 25 of Example 2, the resin main body 21 of polypropylene resin having a conversely concave cross section is used and the soft resin covering part 22 of the styrene based thermoplastic elastomer is laminated on the surface of the resin main body 21.

As the styrene based thermoplastic elastomer, a block polymer in which the hard segment is polystyrene and the soft segment is polybutadiene, polyisoprene or ethyleneisobutyrene copolymer and in which the double bonds in the molecular chains are saturated by the hydrogenation of said soft segment is used. As a styrene based thermoplastic elastomer composition, "RABALON SJ 4400" (manufactured by Mitsubishi Petro-Chemical Co., Ltd.) is used.

The surface of the covering part 22 is processed by an adhesion-improved surface 22a either by the activation treatment such as corona discharge or plasma treatment or by the primer treatment.

Further, a polyurethane based adhesive is coated on the adhesion-improved surface 22a to form the adhesive layer 23. Flocking part 24 comprising polyamide fibers is prepared on the adhesive layer 23 to form the decorating part 26.

The resin product 25 of Example 2 is produced according to the following process: In the first place, the resin main body 21 in the form of center pillar is formed from polypropylene resin. Various kinds of molding methods, for example, injection molding method, may be employed so long as they satisfy the formation of the resin product as described above.

Then, the resin main body 21 is set in the insert metal mold (no Figure), and the styrene based thermoplastic elastomer is injection-molded to form the soft resin covering part 22 having a thickness of 2.5 mm.

The injection molding is carried out under the following conditions:
Cylinder temperature: 200° C.;
Mold temperature: 30° to 70° C.;
Injection pressure: 450 kg/cm$^2$;
Injection time: 5 sec.;
Cooling time: 10 sec.

The activation treatment such as corona discharge and plasma treatment is then applied to the surface of the covering part 22. The corona discharge or plasma treatment is carried out by means of know methods, conditions and apparatuses, and as primers, various kinds of primers suitable for the styrene based thermoplastic elastomer, for example, chloroprene based primers, in which methacrylate is grafted, can be used.

After the adhesion-improved surface 22a is formed on the surface of covering part 22 of the resin product 25 according to this invention, an adhesive is coated on the adhesion-improved surface 22a. As a adhesive, an adhesive to which the flocking can be carried out in the next step and preferably a polyurethane based adhesive of emulsion type is used.

When an adhesive is coated on the surface of the covering part 22, the flocking part 24 are bonded onto the adhesive layer 23 by means of static flocking while the adhesive is evaporated to form the decorating part 26. Thus, the resin product 25 in which the decorating part 26 is on the adhesion-improved surface 22a is obtained.

The actions and effects according to Example 2 are as follows:

First of all, both the resin main body 21 and the covering part 22 contain polyolefin molecular chain, so that a good adhesion between them is obtained and it is not necessary to insert the covering part 22 into the back side of resin main body 21.

Secondly, since a styrene based thermoplastic elastomer is used for the covering part 22, the covering part 22 having a thickness of less than 4 mm can provide a sufficient soft touch and the variation of shape design of the resin product 25 can be increased.

Further, since the adhesion-improved surface 22a is formed on the surface of the covering part 22, an adhesive is easily bonded to the surface so that a good adhesion between the covering part 22 and the decorating part 26 is obtained.

The covering part 22 acts as the soft layer of resin product 25, so that, when the resin product 25 is pressed violently through the flocking part 24 by hand, the resistance of bottom is not felt. Therefore, the resin product 25 has a good soft touch.

And, since the covering part 22 does not contain bubbles as compared with the case in which a foamed resin is used as the covering part in the prior art, the resin product 25 of Example 2 has a higher scratch resistance than to be prescribed, so that, even when edges of rigid body hit upon the covering part 22 through the flocking part 24, the resin product 25 is not damaged and the appearance quality is not deteriorated. Besides the decorating effect, the flocking part 24 removes the slimy touch of the surface of the covering part 22.

On the other hand, the resin product 25 according to this invention can be produced without carrying out the step in which the covering part 22 alone is produced in a separate step and then bonded to the resin main body 21, so that the yield of covering part 22 formed may be not lowered and the elevation of manufacturing cost may be suppressed.

Moreover, the covering part 22 is laminated on the resin main body 21 by a molding method, so that in contrast with the previous method, it is not necessary to employ such a step that the foamed resin is inserted into the back side of resin main body 21 in the production of resin product 25.

As described above in detail, both the resin main body and the soft resin covering part of the resin product according to this invention contain molecular chains of polyolefin series, so that a good adhesion between them are obtained, and it is not necessary to insert the latter into the back side of the former. And even if the covering part have a smaller thickness, the covering part can provide a sufficient soft touch. Further, since an adhesion-improved surface is formed on the surface of the covering part, an adhesive is easily bonded thereto and therefore, an improved adhesion between the covering part and the decorating part can be obtained.

EXAMPLE 3

An example, in which this invention is realized as a kneepad of the automobile, is explained based on FIG. 3-1.

In the resin product 34 of Example 3, the resin main body 31 of polypropylene resin, in which the section is formed as an adversely concave form, is used and the soft resin covering part 32 of a styrene based thermoplastic elastomer is applied on the front surface of the resin main body 31 and further the surface layer 33 of polyolefin is placed thereon. As such styrene based thermoplastic elastomer "RABALON SJ 4400" (manufactured by Mitsubishi Petro-Chemical Co., Ltd.) is used.

The resin product 34 having the structure as described above may be prepared, for example, by the following steps:

In the first place, the resin main body 31 in the form of kneepad is molded from polyolefin such as polypropylene and the like. Various kinds of molding methods such as injection molding method may be used so long as they satisfy the formation of the resin product as described above.

On the other hand, the surface layer 33 is formed in the same manner from polyolefin.

The resin main body 31 is set in the male mold of an injection metal mold (no figure) and the surface layer 33 is set in the female mold. Both male and female mold are joined and the styrene based thermoplastic elastomer is injected between the resin main body 31 and the surface layer 33 to form the soft resin covering part 32 having a thickness of 2.5 mm.

The injection molding is carried out under the following conditions:

Cylinder temperature: 200° C.;
Metal mold temperature: 30° to 70° C.;
Injection pressure: 450 kg/cm$^2$;
Injection time: 5 sec.;
Cooling time: 10 sec.

The actions and effects according to the Example 3 are mentioned as follows: Both the resin main body 31 and the soft resin covering part 32 contain polyolefin chains, so that the styrene based thermoplastic elastomer which is molten in the production step of resin product 34, has an affinity to the resin main body 31 resulting in a strong bonding between them. Therefore, it is not necessary as in the prior art to insert the covering part 32 up to the back side of the resin main body 31. When the soft resin covering part 32 having a thickness of 2.5 mm is formed on the resin main body 31 and the peeling test at 180 degree is carried out, the adhesion strength is 15 kg/cm.

Since the styrene based thermoplastic elastomer is used for the formation of the covering part 32, the soft segment thereof shows a rubbery elasticity and even the covering part 32 having a thickness of less than 4 mm gives a soft touch to the resin product 34, so that the variation of shape design of the resin product 34 may be increased. The increase of copolymerization ratio of the soft segment in the styrene based thermoplastic elastomer decreases the hardness of resin product, so that a far softer resin product 34 can be obtained.

The surface layer 33 of polyolefin is laminated on the covering part 32 and both are bonded strongly with the affinity therebetween. Thus, the surface layer 33 protects the covering part 32 without peeling from the covering part and improves the surface properties of the resin product 34, so that the resin product 34 is improved in the scratch resistance and the weather resistance without the deterioration of appearance quality.

Since the soft resin covering part 32 is laminated on the resin main body 31 by means of injection molding and the like in the production of resin product 34, it is not necessary to employ such step that the covering part 32 is inserted to the back-side of resin main body 31, in contrast with the prior art.

As described above in detail, this invention shows excellent effects in which the soft resin covering part may be bonded strongly on the resin main body, the variation of shape design of the resin product can be increased and the surface layer can be bonded strongly on the covering part to improve the surface properties of the covering part.

EXAMPLE 4

An example, in which this invention is realized as a kneepad which is one of automobile internal trim parts, is explained based on FIG. 4-1.

On the surface of an adversely U-shaped base material 44 of metal such as steel, aluminum, etc., a film or sheet of polyolefin which is fused to the one surface of the base material 44, or the resin main body 41 which is obtained by coating a dispersion of polyolefin dissolved in a solvent and evaporating the solvent are formed. The soft resin covering part 42 of a styrene based thermoplastic elastomer composition is formed on the surface of the resin main body 41. As such styrene based thermoplastic elastomer composition "RABALON SJ 4400" (manufactured by Mitsubishi Petro-Chemical Co., Ltd.) is used.

The thickness of the soft resin covering part 42 is not critical but preferably those having a thickness of 2.5 mm are used in this invention.

As described above, the resin product 45 in which the soft resin covering part 42 is formed through the resin main body 41 on the base material 44 may be produced by various methods and preferably methods as follows: An insert (no figure) is formed, in which the resin main body 41 of polyolefin film and the like is bonded to the one surface of the base material 44 by means of known method, for example, a bonding means such as high frequency heating.

Then, the insert is set in an injection metal mold and the styrene based thermoplastic elastomer is then injected in the metal mold to laminate the covering part 42 through the resin main body 41 on the base material 44. The injection molding is carried out under the following conditions: tions:
Cylinder temperature: 200° C.;
Metal mold temperature: 30° to 70° C.;
Injection pressure: 450 kg/cm$^2$;
Injection time: 5 sec.;
Cooling time: 10 sec.

The acts and effects according to Example 4 are explained as follows: The resin main body 41 is made of polyolefin, so that it may be bonded well to the soft resin covering part 42 having polyolefin molecular chains with a good affinity.

According to the peeling test at 180 degrees, in which a test piece which is formed by forming the covering part 42 having a thickness of 2.5 mm through the resin main body 41 of polyethylene on the base material 44 is used, the adhesion strength was 15 kg/cm. To the contrary, a test piece in which the covering part 42 is bonded to the base material 44 without the resin main body 41 allows an easy separation of the covering part 42 from the base material 44.

The covering part 42 is formed from a thermoplastic elastomer of styrene series, so that the soft segment thereof shows a rubbery elasticity and the resin product 45, in spite of using the thin covering part 42, shows an excellent softness. The hardness of resin product can be varied by selecting the copolymerization ratio of soft segment component. As a result, the thickness of the covering part 42 may be remarkably reduced than that of a formed covering part according to the prior art resulting in an increased variation of shape design of resin product.

The injection molding method may be employed in the production of the resin product 45, so that the curing step and the deburring step of foam material is not necessary in contrast with the prior art resulting in the simplification of production steps.

As described above in detail, this invention shows excellent effects in which the styrene based thermoplastic elastomer having a good softness can be bonded onto the base material which is difficultly bonded directly to the elastomer, the resin product having a small thickness can be produced, the resin product can be lightened and the variation of shape design may be kept.

As compared with the prior art in which a foam material is used as a soft layer, this invention may simplify the production steps.

EXAMPLE 5

An example, in which this invention is realized as a kneepad which is one of automobile internal trim parts is explained based on FIG. 5-1.

On the surface of an adversely U-shaped base material 54 of metal such as steel, aluminum, etc., a film or sheet of polyolefin which is fused to the one surface of the base material 54, or the resin main body 51 which is obtained by coating a dispersion of polyolefin dissolved in an solvent and evaporating the solvent are formed. The soft resin covering part 52 of the styrene based thermoplastic elastomer is formed on the surface of the resin main body 51. As such styrene thermoplastic elastomer composition, "RABALON SJ 4400" (manufactured by Mitsubishi Petro-Chemical Co., Ltd.) is used.

The thickness of soft resin covering part 52 is not critical but preferably less than 4 mm in this invention.

The surface layer 53 of polyolefin such as polyethylene, polypropylene, and the like is formed on the front surface of the covering part 52. The thickness of the surface layer 53 is determined within such range that may protect the covering part 52 without the deterioration of its softness. In this example, the thickness is about 0.1 to 0.7 mm.

As described above, the resin product 55, in which the soft resin covering part 52 and the surface layer 53 are successively laminated through the resin main body 51 on the base material 54, may be formed in various methods and preferably in the following manner:

As insert (no figure) is formed, in which the resin main body 51 of polyolefin film and the like is bonded to the one surface of the base material 54 by means of wellknown method, for example, a bonding means such as high frequency heating and the surface layer 53 is formed from polyolefin by means of injection molding and the like.

Then, the insert is set in the male mold of an injection metal mold and the surface layer 53 is set in the female mold. The styrene based thermoplastic elastomer is then injected between the insert and the surface layer to form the covering part 52 resulting in the formation of the resin product, in which the covering part 52 and the surface layer 53 are successively bonded through the resin main body 51 onto the base material 54. The injection is carried out under the following conditions.

Cylinder temperature: 200° C.;
Metal mold temperature: 30° to 70° C.;
Injection pressure: 450 kg/cm$^2$;
Injection time: 5 sec.;
Cooling time: 10 sec.

The acts and effects according to Example 5 are explained as follows: The resin main body 51 is made of polyolefin, so that it may be bonded well to the base material 54 as well as to the soft resin covering part 52 containing polyolefin chains same as the resin main body 51 resulting in a strong bonding of the covering part 52 through the resin main body 51 to the base material 54. According to the peeling test at 180 degrees, in which a test piece which is formed by forming the covering part 52 having a thickness of 2.5 mm through the resin main body 51 of polyethylene on the base material 54 is used, the adhesion strength is 15 kg/cm. A test piece in which the resin main body 51 is not bonded allows an easy separation of covering part 52 from the base material 54.

The soft resin covering part 52 is made of the styrene based thermoplastic elastomer so that the soft segment thereof provides a soft touch to the resin product. The soft touch may be varied by selecting the components of the soft segment and the copolymerization ratio thereof. Therefore, according to this invention, the thickness of the covering part 52 can be remarkably reduced than the covering part formed from a foam of the prior art, so that the resin product 55 may be lightened and the variation of shape design thereof is increased.

The surface layer 53 also made of polyolefin, so that it may be bonded well to the covering part 52 having polyolefin molecular chains and protect it sufficiently. The softer the covering part 52 is, the more the surface properties are deteriorated; the surface layer can compensate sufficiently the deterioration of surface properties. Therefore, the styrene based thermoplastic elastomer having a lower hardness may be used as much as the covering part 52.

The injection molding method may be employed in the production of the resin product 55, so that the curing step and the deburring step of foam material is not necessary in contrast with the prior art resulting in the simplification of production steps.

As described above in detail, this invention shows excellent effects in which the production of the resin product in which the soft resin covering part has a small thickness, may be attained and the lightening of resin product as well as the variation of design may be ensured. Further, the covering part is bonded well through the resin main body to the base material, the protection of the covering part by the surface layer improves the surface properties of the resin product, so that the softer styrene based thermoplastic elastomer may be used as the covering part.

EXAMPLE 6

An example, in which this invention is realized as a molding laminate sheet which is used in such manner that the polyolefin resin layer is the front surface of resin product, is explained based on FIGS. 6-1 to 6-3 as follows:

The molding laminate sheet 63 according to Example 6, as shown in FIG. 6-1, has a structure in which the polyolefin resin layer 61 (i.e., resin main body) having a thickness of 0.4 mm is laminated on the surface of soft resin covering part 62 having a thickness of about 4 mm of styrene based thermoplastic elastomer.

For the lamination, the following methods may be employed suitably selectively: (1) a press molding method in which each layer 61 and 62 is pressed out respectively from respective press and thereafter directly laminated each other; (2) a method in which the preformed resin main body 61 of polyolefin is laminated by means of laminator to the covering part 62 of the styrene based thermoplastic elastomer which is pressed out from a press; (3) an insert injection molding method in which the covering part 62 of styrene based thermoplastic elastomer is injected into a metal mold for injection in which the resin main body 61 is set previously.

The styrene based thermoplastic elastomer is a high molecular substance which is excellent in the adhesion to polyolefin resin. Therefore, the covering part 62 of the styrene based thermoplastic elastomer and the resin main body 61 of polyolefin are laminated by a strong adhesion force without subjecting to activation or primer treatment and the separation between the two is not caused during the formation of resin product and the use of the resin product as mentioned hereinafter.

The thickness of soft resin covering part 62 of styrene based thermoplastic elastomer is sufficiently at least 0.5 mm resulting in a soft touch and the upper limit of the thickness depends on the possibility of molding and is determined case by case.

Since the resin main body of polyolefin resin functions as a protective layer for the covering part 62 of styrene based thermoplastic elastomer, the hardness and thickness thereof may be designed so that the softness of the covering part 62 of styrene based thermoplastic elastomer is not damaged, namely the soft touch of the covering part 62 of styrene based thermoplastic elastomer may be given through the resin main body 61 of polyolefin.

The copolymerization ratio of the soft segment to the total styrene based thermoplastic elastomer (hereinafter referred to as "copolymerization ratio") is determined in consideration of softness thereof and a greater copolymerization ratio may be employed to obtain the covering part 62 having a low hardness and a high softness of styrene based thermoplastic elastomer.

In the peeling test at 180 degrees of a molding laminate sheet 63, the "RABALON SJ 4400" (manufactured by Mitsubishi Petro-Chemical Co., Ltd.) is used as the styrene based thermoplastic elastomer layer, a polypropylene is used as the resin main body of polyolefin, and both layers 61 and 62 are laminated by the insert injection molding method. The adhesion strength is 15 kg/cm.

The manufacture of resin products with the molding laminate sheet 63 as formed above by means of insert injection molding is explained based on FIG. 6-2:

At first place, the molding laminate sheet 63 is soften with heating and set in an injection metal mold in such manner that the resin main body 61 of polyolefin is faced to the mold surface of the movable mold 71 of the metal mold.

The movable mold 71 is then joined to the stationary mold 72 and a polypropylene resin as base material is injected therein from an injection nozzle 73 of the stationary mold 72. The polypropylene resin is filled in the cavity of both molds 71, 72 to form the resin base material 64 as shown in FIG. 6-3 and bonded to the back surface of covering part 62 of styrene based thermoplastic elastomer of the molding laminate sheet 63.

In this case, the covering part 62 of styrene based thermoplastic elastomer is subjected to heat and pressure. However, since the covering part 62 of thermoplastic elastomer of styrene series is provided with the softness depending not on voids as in the spongy soft resin covering part in the prior art but on the soft segment, the covering part is not broken during the injection molding.

When both molds 71 and 72 are separated after the resin based material 64 is solidified on cooling, the resin product 65 as shown in FIG. 6-3 can be taken out.

The covering part 62 of styrene based thermoplastic elastomer in the resulting resin product 65 functions as a soft layer giving soft touch.

On the other hand, the resin main body 61 of polyolefin functions as a protective layer, i.e., the surface layer for the covering part 62 of styrene based thermoplastic elastomer without damaging its softness.

Thus, the resin base material 64 constitutes the resin main body of polyolefin according to this invention.

EXAMPLE 7

An example, in which this invention is realized as a molding laminate sheet which is used in such manner that the styrene based thermoplastic elastomer layer is the front surface of resin product, is explained based on FIG. 6-4 to 6-5.

The molding laminate sheet 63 according to Example 7, as shown in FIG. 6-4, has the structure in which the resin main body 61 having a thickness of about 2 mm of poyolefin is laminated on the back surface of soft resin covering part 62 having a thickness of about 2 mm of styrene based thermoplastic elastomer. The materials for each layer 61 and 62, molding conditions and laminating method are the same as in Example 6 and the molding laminate sheet 63 shows acts and effects almost similar to that of Example 6.

On the other hand, the resin main body 61 of polyolefin functions as the resin base material itself of resin product or an interlayer between the covering part 62 of styrene based thermoplastic elastomer and another resin base material, so that the hardness and thickness thereof may be determined at will so long as it can be molded. The resin main body 61 of polyolefin may be formed from a hard glass fiber filled polypropylene and the like.

The resin product 65 as shown in FIG. 6-5 is obtained by, for example, direct blow-molding of the molding laminate sheet 63 after softening it with heat.

The covering part 62 of styrene based thermoplastic elastomer in the resulting resin product 65 functions as a soft layer of front surface giving a soft touch. On the other hand, the resin main body 61 of polyolefin functions as the resin base material itself.

When the resin product is formed with the molding laminate sheet 63 as in Example 6, the resin main body 61 of polyolefin functions as an interlayer between the covering part 62 of styrene based thermoplastic elastomer and another resin base material.

As described above in detail, this invention shows excellent effects in which a good adhesion between the soft resin covering part of styrene based thermoplastic elastomer and the resin main body of polyolefin is obtained, even a small thickness of the covering part of styrene based thermoplastic elastomer can provide a prescribed soft touch and the covering part of styrene based thermoplastic elastomer is not crushed when the resin product is formed with the molding laminate sheet.

As described above, in the resin product according to this invention, the resin main body is made of polyolefin and the soft resin covering part is formed with a styrene based thermoplastic elastomer composition having a hardness $H_s$ (JIS K 6301) of 20 to 50 resulting in giving the following acts and effects:

Since the adhesion between the resin main body and the soft resin covering part is so good that it may be not necessary to subject the surface of the resin product to the activation treatment or coat it with a primer in contrast with the prior art.

The reason why a good adhesion is obtained is based on the fact that the inter block of styrene based thermoplastic elastomer is a polyolefin based compound, which contains same kind of polyolefin molecular chain as polymer which forms the resin main body, and the both have a good affinity.

Since the soft resin covering part comprises a styrene based thermoplastic elastomer, even a small thickness thereof can provide a soft resin product having an excellent softness.

While the invention has been described in detail and with reference to specific embodiments thereof, it will be apparent to one skilled in the art that various changes and modifications can be made therein without departing from the spirit and scope thereof.

What is claimed is:

1. A soft resin product comprising a resin main body and a soft resin covering part, wherein said resin main body further comprises:
   (1) polyolefin, and
   (2) said soft resin covering part comprises a styrene based thermoplastic elastomer which is a styrene-ethylene-butylene-ethylene block copolymer having a hardness $H_s$ of 20 to 50.

2. A soft resin product as claimed in claim 1, wherein said resin main body is a sheet of polyolefin and said soft resin covering part is a sheet of a styrene based thermoplastic elastomer composition.

3. A soft resin product as claimed in claim 1, wherein the front surface of said soft resin covering part is coated with a paint.

4. A soft resin product as claimed in claim 3, wherein said paint is a polyurethane or acrylic type paint.

5. A soft resin product as claimed in claim 1, wherein a surface layer of polyolefin is formed on the front surface of said soft resin covering part.

6. A soft resin product as claimed in claim 1, wherein the front surface of said soft resin covering part is subjected to activation treatment or adhesion-improving treatment comprising corona discharge treatment, plasma treatment or primer treatment, and further a decorating part is formed thereon.

7. A soft resin product as claimed in claim 6, wherein said decorating part is a paint layer coated with a paint, a flocked layer or a layer adhered with a sheet comprising cloth.

8. A soft resin product as claimed in claim 1, wherein said soft resin product comprises a resin main body adhered to a base material and a soft resin covering part.

9. A soft resin product as claimed in claim 8, wherein said based material is a metal.

10. A soft resin product as claimed in claim 8, wherein a surface layer of polyolefin is formed on the surface of said soft resin covering part.

11. A soft resin product as claimed in claim 10, wherein a coating or a flocking is additionally carried out onto the surface layer of polyolefin to form a decorating part.

* * * * *